United States Patent [19]

Nishiyama et al.

[11] Patent Number: 5,431,982
[45] Date of Patent: Jul. 11, 1995

[54] UNIDIRECTIONALLY LONG BIAXIALLY ORIENTED FILM OF POLYETHYLENE-2,6-NAPHTHALENEDICARBOXYLATE

[75] Inventors: Masanori Nishiyama; Yasuhiro Saeki, both of Sagamihara, Japan

[73] Assignee: Teijin Limited, Osaka, Japan

[21] Appl. No.: 275,736

[22] Filed: Jul. 19, 1994

Related U.S. Application Data

[63] Continuation of Ser. No. 187,678, Jan. 28, 1994, abandoned.

Foreign Application Priority Data

Jan. 29, 1993 [JP]  Japan .................. 5-013593

[51] Int. Cl.⁶ .............................................. D06N 7/04
[52] U.S. Cl. ...................................... 428/141; 428/220; 428/332; 428/333; 428/338; 428/339; 428/357; 428/900; 360/134; 528/298; 528/480; 528/502 B; 528/503
[58] Field of Search ............... 428/141, 220, 332, 333, 428/338, 339, 357, 900; 360/134; 528/298, 480, 502, 503

[56] References Cited

U.S. PATENT DOCUMENTS

| | | | |
|---|---|---|---|
| 4,670,319 | 6/1987 | Katoh et al. | 428/141 |
| 4,732,799 | 3/1988 | Sakamoto et al. | 428/141 |
| 4,804,736 | 2/1989 | Utsumi | 528/176 |
| 4,814,221 | 3/1989 | Utsumi | 428/220 |
| 4,833,019 | 5/1989 | Suwarnasam | 428/336 |
| 4,876,137 | 10/1989 | Utsumi | 428/141 |
| 5,051,292 | 9/1991 | Katoh et al. | 428/141 |
| 5,215,825 | 6/1993 | Hiraoka et al. | 428/480 |
| 5,270,160 | 12/1993 | Hiraoka et al. | 430/634 |

FOREIGN PATENT DOCUMENTS 0535240  4/1993  European Pat. Off.

OTHER PUBLICATIONS

Derwent Abstract of Japanese Laid–Open Patent Publication No. 4-226328 (Aug. 17, 1992).
Derwent Abstract of Japanese Laid ∝ Open Patent Publication No. 2-039998 (Feb. 8, 1990).
Derwent Abstract of Japanese Laid–Open Patent Publication No. 62-169619 (Jul. 25, 1987).
Derwent Abstract of Japanese Laid–Open Patent Publication No. 50-100174 (Aug. 8, 1975).
Derwent Abstract of Japanese Laid–Open Patent Pulbication No. 5-286028 (Nov. 2, 1993).

*Primary Examiner*—Samuel A. Acquah
*Attorney, Agent, or Firm*—Sherman and Shalloway

[57] ABSTRACT

A unidirectionally long, biaxially oriented film of polyethylene-2,6-naphthalenedicarboxylate:

(A) which has a Young's modulus of 400 to 600 kg/mm² in the machine direction and a Young's modulus of at least 1,200 kg/mm² in the transverse direction, the ratio of Young's modulus in the transverse direction to the Young's modulus in the machine direction being at least 2.5, (B) which has a heat shrinkage of 1% or less after heat-treated under no load at 105° C. for 30 minutes, and (C) which has a surface roughness (Ra) of 0.005 to 0.010 μm.

This film is useful as a base film for magnetic tape having the capacity of log hours' recording and reproduction.

10 Claims, No Drawings

UNIDIRECTIONALLY LONG BIAXIALLY ORIENTED FILM OF POLYETHYLENE-2,6-NAPHTHALENEDICARBOXYLATE

This application is a continuation of application Ser. No. 08/187,678, filed Jan. 28, 1994, now abandoned.

DETAILED DESCRIPTION OF THE INVENTION

The present invention relates to a unidirectionally long, biaxially oriented film of polyethylene-2,6-naphthalenedicarboxylate. More specifically, it relates to a unidirectionally long, biaxially oriented film of polyethylene-2,6-naphthalenedicarboxylate useful as a base film for a magnetic tape having the capacity of long hours' recording and reproduction, particularly a base film for a compact cassette video tape for a small-sized VTR, and for a high-density and large capacity recording medium, particularly a magnetic tape for computer data storage.

A magnetic tape produced by forming a magnetic layer on the surface of a film of biaxially oriented polyethylene terephthalate has been and is widely used as such. In recent years, for the "longer" playing with a magnetic tape and for decreasing the size of a hardware, it is required to use a longer tape that can be encased in a cassette for accomplishing longer hours' recording and reproduction. For this purpose, it is required to decrease the thickness of a magnetic tape. However, a conventional magnetic tape has a problem in that the running durability and the contact to a head deteriorate when its thickness is decreased. That is, when the film thickness is decreased, the stiffness of the tape decreases, and the tape edge is liable to be damaged when the tape is loaded and unloaded, or the tape is liable to be deformed under instantaneous tension, thereby to strain recorded data. Further, when a tape having a decreased thickness is made to run repeatedly, the tape edge may be damaged to be deformed in a wavy form, or the tape edge may be folded or bent when the tape hits a side control guide, thereby not only to impair the tape characteristics but also to deteriorate the electromagnetic conversion characteristics.

WO92/16356 (PCT/JP92/00338) discloses a unidirectionally long, biaxially oriented polyethylene-2,6-naphthalate film useful for producing a magnetic recording media having all of flatness, lubricity and durability, which film has a Young's modulus of at least 550 kg/mm$^2$ in the machine direction and a Young's modulus of at least 600 kg/mm$^2$ in the transverse direction, the Young's modulus in the transverse direction being greater than that in the machine direction. In the unidirectionally long, biaxially oriented film disclosed in the above Publication, however, the Young's modulus in the transverse direction is 1,100 kg/mm$^2$ at most.

In a biaxially oriented film formed from polyethylene-2,6-naphthalenedicarboxylate as a raw material, generally, the Young's modulus in the machine direction and the Young's modulus in the transverse direction are not independent of each other, and these Young's moduli have the relationship that when one Young's modulus is increased, the other Young's modulus decreases. The above Publication does not specifically disclose any biaxially oriented film which is arranged to have a very large Young's modulus in the transverse direction, as large as, for example, 1,200 kg/mm$^2$ while the Young's modulus of, for example, at least 400 kg/mm$^2$ is maintained in the machine direction.

Therefore, it is an object of the present invention to provide a unidirectionally long, biaxially oriented film of polyethylene-2,6-naphthalenedicarboxylate.

It is another object of the present invention to provide a unidirectionally long, biaxially oriented film of polyethylene-2,6-naphthalenedicarboxylate of which the Young's modulus in the transverse direction is remarkably greater than the Young's modulus in the machine direction.

It is further another object of the present invention to provide a unidirectionally long, biaxially oriented film of polyethylene-2,6-naphthalenedicarboxylate is very thin but is free from the deformation of a tape edge in a wavy form and the folding or bending of a tape edge.

It is still further another object of the present invention to provide a unidirectionally long, biaxially oriented film of polyethylene-2,6-naphthalenedicarboxylate which gives a magnetic recording medium excellent in running properties, durability and electromagnetic characteristics.

It is yet another object of the present invention to provide a magnetic tape in which the biaxially oriented film of the present invention is used as a base film.

Other objects and advantages of the present invention will be apparent from the following description.

According to the present invention, the above objects and advantages of the present invention are achieved by a unidirectionally long, biaxially oriented film of polyethylene-2,6-naphthalenedicarboxylate:

(A) which has a Young's modulus of 400 to 600 kg/mm$^2$ in the machine direction and a Young's modulus of at least 1,200 kg/mm$^2$ in the transverse direction, the ratio of Young's modulus in the transverse direction to the Young's modulus in the machine direction being at least 2.5, (B) which has a heat shrinkage of 1% or less after heat-treated under no load at 105° C. for 30 minutes, and (C) which has a surface roughness (Ra) of 0.005 to 0.010 μm.

The polyethylene-2,6-naphthalenedicarboxylate which is to constitute the film of the present invention is formed from 2,6-naphthalenedicarboxylic acid as a main acid component and ethylene glycol as a main glycol component, while a small amount of other dicarboxylic acid component and a small amount of other glycol component may be contained as the copolymerized units. Examples of the dicarboxylic acid component other than 2,6-naphthalenedicarboxylic acid include aromatic dicarboxylic acids such as terephthalic acid, isophthalic acid, diphenylsufonedicarboxylic acid and benzophenonedicarboxylic acid; aliphatic dicarboxylic acids such as succinic acid, adipic acid, sebacic acid and dodecanedicarboxylic acid; and alicyclic dicarboxylic acids such as hexahydroterephthalic acid and 1,3-adamantanedicarboxylic acid. Examples of the glycol component other than ethylene glycol include 1,3-propanediol, 1,4-butanediol, 1,6-hexanediol, neopentyl glycol, 1,4-cyclohexanedimethanol and p-xylylene glycol.

The above polyethylene-2,6-naphthalenedicarboxylate can be generally produced by a known melt polymerization method, and the melt polymerization may be carried out in the presence of a catalyst, a stabilizer, a colorant and a lubricant as required. The polyethylene- 2,6-naphthalenedicarboxylate preferably has an intrinsic viscosity of 0.45 to 0.90.

In the biaxially oriented film of the present invention, the Young's modulus in the machine direction (Em) is in the range of 400 to 600 kg/mm$^2$. When the Young's modulus in the machine direction is less than 400 kg/mm$^2$, undesirably, the tape is liable to elongate to be deformed when an instantaneous high stress is exerted on the tape. The Young's modulus in the machine direction is preferably 400 to 570 kg/mm$^2$, more preferably 400 to 540 kg/mm$^2$.

Further, in the biaxially oriented film of the present invention, the Young's modulus in the transverse direction (Et) is at least 1,200 kg/mm$^2$. When the Young's modulus in the transverse direction is smaller than 1,200 kg/mm$^2$, undesirably, the tape edge is liable to be damaged to be deformed in a wavy form when a tape, particularly a thin one (thickness: 4 to 7 μm), is made to run repeatedly. Further, the tape edge may be folded or bent when the tape hits a side control guide, thereby to impair the tape characteristics.

The Young's modulus in the transverse direction (Et) is preferably at least 1,300 kg/mm$^2$, more preferably at least 1,500 kg/mm$^2$.

In the biaxially oriented film of the present invention, further, the ratio of the Young's modulus in the transverse direction (Et) to the Young's modulus in the machine direction (Em) (Et/Em) is at least 2.5, preferably at least 3.

The biaxially oriented film of the present invention has a heat shrinkage of 1% or less after heat-treated under no load at 105° C. for 30 minutes. When the above heat shrinkage increases 1%, undesirably, a magnetic tape as an end product undergoes extreme shrinkage to cause curling and wrinkling.

In the biaxially oriented film of the present invention, further, the surface roughness (Ra) is required to be 0.005 to 0.010 μm. When the surface roughness (Ra) is greater than 0.010 μm, the electromagnetic conversion characteristics required of a magnetic tape are hard to maintain. When it is smaller than 0.005 μm, undesirably, the friction coefficient is so large that the film running properties are poor and it is difficult to take up the film in the form of a roll.

The above surface roughness (Ra) can be adjusted by incorporating inert fine particles into polyethylene-2,6-naphthalenedicarboxylate as a raw material or by treating, e.g., coating treating, the film surface. The inert fine particles are selected from inorganic fine particles containing elements of Groups IIA, IIB, IVA or IVB such as calcium carbonate, alumina and silicon dioxide and fine particles of a heat-resistant polymer such as a silicone resin or crosslinked polystyrene. When inert fine particles are incorporated, for example, it is preferred to incorporate 0.15% by weight, based on the polymer weight, of silica fine particles having an average particle diameter of 0.28 μm.

In the biaxially oriented film of the present invention, the plane orientation degree is preferably 0.25 or less, more preferably 0.245 or less.

The biaxially oriented film of tile present invention has a film thickness of preferably 4 to 10 μm, more preferably 4 to 7 μm. Due to the film thickness of 10 μm or less, a longer magnetic tape can be encased in a cassette thereby to accomplish the long hours' recording and reproduction and satisfy the durability.

Basically, the biaxially oriented film of the present invention can be produced by a method known per se. For example, it can be produced by melt-extruding polyethylene-2,6-naphthalenedicarboxylate preferably at a temperature between its melting point (Tm: °C.) and (Tm+70)°C., rapidly cooling to solidify the extrudate thereby to obtain an unstretched sheet, stretching the unstretched sheet monoaxially (in the machine direction) at a temperature between (Tg−10) and (Tg+70)°C. (in which Tg refers to the glass transition temperature of polyethylene-2,6-naphthalenedicarboxylate), stretching the monoaxially stretched sheet at right angles (in the transverse direction) at a temperature between Tg and (Tg+70)°C. and further thermosetting the biaxially oriented film.

The stretching in the machine direction is carried out at a stretch ratio of preferably 2 to 4, more preferably 2 to 3. The stretching in the transverse direction is carried out at a stretch ratio of preferably 5.5 to 8, more preferably 5.5 to 7. The thermosetting is preferably carried out at a temperature between 190° and 250° C. for 1 to 60 seconds.

Generally, when the plane orientation degree and longitudinal orientation degree of a film increase in the production of the biaxially oriented film, it is required to increase the stretch ratio in the transverse direction to excess for increasing the Young's modulus in the transverse direction, and it is hence very difficult to form a thin film as the biaxially oriented film.

In the above method for producing the biaxially oriented film of the present invention, therefore, the stretching in the machine direction is carried out at a relatively low stretch ratio thereby to control the longitudinal orientation and plane orientation, and as a result, there can be obtained a film having a high orientation degree in the transverse direction without increasing the stretch ratio in the transverse direction to excess.

The biaxially oriented film of the present invention, obtained by the above method, preferably has a plane orientation of 0.25 or less as described above. The orientation of the film in the logitudinal direction is preferably 1.025 or less.

The magnetic tape of the present invention is obtained by forming a magnetic layer on a substrate formed of the above biaxially oriented film of polyethylene-2,6-naphthalenedicarboxylate. The magnetic material to form the above magnetic layer is preferably selected from ferromagnetic metals such as cobalt, iron and nickel and alloys formed from at least two of these or from at least one of these and chromium or tungsten. The magnetic layer is most preferably formed, for example, by a method in which the magnetic metal and binder are mixed and the mixture is coated. The thickness of the magnetic layer is preferably approximately 2.0 to 3.5 μm.

In the magnetic tape of the present invention, the surface of the tape on which no magnetic layer is formed may be provided with a coating (thickness: 0.5 to 1.0 μm) formed of an organic polymer containing a lubricant for maintaining running properties as a magnetic tape.

The biaxially oriented film of polyethylene2,6-naphthalenedicarboxylate of the present invention can give a magnetic tape which has the capacity of long hours' recording and reproduction and is excellent in running properties and durability.

The present invention will be explained more in detail hereinafter with reference to Examples. The various properties and characteristics described in the present invention were measured or are defined as follows.

(1) Young's modulus, tensile strength and elongation

A film was cut to prepare a sample having a width of 10 mm and a length of 150 mm, and the sample was tensioned with an Instron type universal tensile tester at an interchuck distance of 100 mm, at a tension rate of 10 mm/minute and at a chart rate of 500 mm/minute. The Young's modulus was calculated on the basis of a tangent of a first rise portion of a load-elongation ratio curve.

(2) Orientation

A film sample was measured with an Abbe refractometer supplied by Atago Co. for a refractive index (nm) in the machine direction, a refractive index (nt) at right angles with it (in the transverse direction) and a refractive index (nz) in the film thickness direction. The plane orientation and longitudinal orientation were calculated by the following equations.

Plane orientation $= (nm + nt)/2 - nz$

Longitudinal orientation $= nm/\bar{n}$ wherein: $\bar{n} = (nm + nt + nz)/3$ (3) Running properties of magnetic tape A magnetic tape was set in a home video tape recorder (helical scanning) and while it was allowed to run and stop repeatedly for 100 hours, the tape was evaluated for running state and measured for an output. The running durability of the tape was determined on the basis of the following three ratings.

◯: Tape edge neither bends nor deforms in a wavy form. Further, no abrasion occurs, and no white dust adheres.

Δ: Tape edge bends and deforms in a wavy form to some extent. Further, adherence of a small amount of white dust is observed.

X: Tape edge extraordinarily bends and deforms in a wavy form. Further, the tape is heavily abraded, and a large amount of white dust occurs.

(4) Output

The output signal (envelope output waveform) for one image plane in reproduction with a tape was observed, and the output was evaluated on the basis of the following three ratings.

◯: Output signal is high and flat, thus being excellent (the contact to a head is excellent)

Δ: Output signal is distorted upwardly or downwardly in the central portion, thus being not so good.

X: Output signal itself is low and deformed, thus being inferior (the contact to head is poor).

(5) Electromagnetic conversion characteristics

A magnetic tape for video use was measured for an S/N ratio with a noise meter supplied by Shibasoku Co., Ltd. Further, a difference between the so-obtained S/N ratio and the S/N ratio of a tape of Comparative Example 1 in Table 1 was determined. A VTR, EV-S700, supplied by Sony Co., Ltd., was used.

(6) Heat shrinkage

A film having a length of 300 mm and a width of 10 mm, which had been accurately measured for its length in advance, was placed in an oven at 105° C. under no load, and heat-treated for 30 minutes. Then, the film was taken out of the oven, allowed to stand until it had a room temperature, and then measured for a length to determine a change in the length. The heat shrinkage was determined by the following equation, Heat shrinkage $= \frac{\Delta L}{L_0} \times 100$ in which $L_0$ is the length before the heat treatment and $\Delta L$ is the amount of a dimensional change after heat treatment.

(7) Film surface roughness (Ra)

A chart (film surface roughness curve) was prepared with a needle-contacting type surface roughness tester (Surfcoder 30C, supplied by Kosaka Laboratories Ltd.) with a needle radius of 2 μm under a needle pressure of 30 mg. A portion having a measured length L in the direction of its center line was picked up from the film surface roughness curve. The center line of this portion picked up was taken as an X axis, the direction of the length multiplication was taken as a Y axis, and the roughness curve was expressed as $Y = f(x)$. The value (Ra; μm) given by the following equation was defined as a film surface roughness.

$$Ra = \frac{1}{L} \int_0^L |f(x)| dx$$

In the present invention, the measurement length was set at 1.25 mm, and the cut-off value was 0.08 mm. The measurement was carried out five times, and the average value was taken as Ra.

EXAMPLES 1-4 AND COMPARATIVE EXAMPLE 1

Pellets of polyethylene-2,6-naphthalenedicarboxylate containing 0.15% by weight of spherical silica fine particles whose average particle diameter was 0.28 μm and having an intrinsic viscosity of 0.61 were dried at 170° C. for 5 hours. The dried pellets were melt-extruded at 300° C. and the extrudate was rapidly cooled on a casting drum kept at 60° C. to solidify it, whereby an unstretched film was obtained.

The above-obtained unstretched film was stretched in the machine and transverse directions at one step under conditions shown in Table 1 and then heat-treated at 205° C. to give a biaxially oriented polyethylene-2,6-naphthalenedicarboxylate film having a thickness of 5.0 μm.

Separately, a composition containing the following components was placed in a ball mill and kneaded and dispersed for 16 hours. Then, 5 parts by weight of an isocyanate compound (Desmodur L, supplied by Bayer AG) was added, and the mixture was dispersed at a high speed under shear force for 1 hour to prepare a magnetic coating composition.

| Composition of magnetic coating composition: | |
|---|---|
| Acicular Fe particles | 100 parts by weight |
| Vinyl chloride-vinyl acetate copolymer (S-Lec 7A, supplied by Sikisui Chemical Co., Ltd.) | 15 parts by weight |
| Thermoplastic polyurethane resin | 5 parts by weight |
| Chromium oxide | 5 parts by weight |
| Carbon black | 5 parts by weight |
| Lecithin | 2 parts by weight |
| Fatty acid ester | 1 part by weight |
| Toluene | 50 parts by weight |
| Methyl ethyl ketone | 50 parts by weight |
| Cyclohexanone | 50 parts by weight |

The so-obtained magnetic coating composition was applied to one surface of the above-obtained polyethylene-2,6-naphthalenedicarboxylate film such that the coating thickness was 3 μm, and the resultant coating was subjected to orientation treatment in a direct current magnetic field at 2,500 Gauss. Then, the coating was dried under heat at 100° C. and supercalendered (linear pressure 200 kg/cm, temperature 80° C.), and the resultant tape was taken up. The so-obtained tape in a roll form was allowed to stand in an oven at 55° C. for 3 days.

Further, a back-coating layer coating composition containing the following components was applied such that the thickness was 1 μm, and dried, to give a magnetic tape.

| Back-coating layer coating composition | |
| --- | --- |
| Carbon black | 100 parts by weight |
| Thermoplastic polyurethane resin | 60 parts by weight |
| Isocyanate compound (Coronate L, supplied by Nippon Polyurethane Co., Ltd.) | 18 parts by weight |
| Silicone oil | 0.5 part by weight |
| Methyl ethyl ketone | 250 parts by weight |
| Toluene | 50 parts by weight |

Table 1 shows the properties of the above-obtained film and tape. As is clear in Table 1, the above-obtained biaxially oriented polyethylene-2,6-naphthalenedicarboxylate films were excellent in all of the running properties, output and electromagnetic conversion characteristics.

(A) which has a Young's modulus of 400 to 600 kg/mm$^2$ in the machine direction and a Young's modulus of at least 1,200 kg/mm$^2$ in the transverse direction, the ratio of Young's modulus in the transverse direction to the Young's modulus in the machine direction being at least 2.5, (B) which has a heat shrinkage of 1% or less after heat-treated under no load at 105° C. for 30 minutes, and (C) which has a surface roughness (Ra) of 0.005 to 0.010 μm.

2. The unidirectionally long, biaxially oriented film of claim 1, wherein the Young's modulus in the machine direction is 400 to 570 kg/mm$^2$.

3. The unidirectionally long, biaxially oriented film of claim 1, wherein the Young's modulus in the machine direction is 400 to 540 kg/mm$^2$.

4. The unidirectionally long, biaxially oriented film of claim 1, wherein the Young's modulus in the transverse direction is at least 1,300 kg/mm$^2$.

5. The unidirectionally long, biaxially oriented film of claim 1, wherein the Young's modulus in the transverse direction is at least 1,500 kg/mm$^2$.

6. The unidirectionally long, biaxially oriented film of claim 1, wherein the ratio of Young's modulus in the transverse direction to the Young's modulus in the machine direction is at least 3.

7. The unidirectionally long, biaxially oriented film of claim 1, which has a plane orientation of 0.25 or less.

8. The unidirectionally long, biaxially oriented film of claim 1, which has a thickness of 4 to 10 μm.

9. The unidirectionally long, biaxially oriented film of claim 1, which has a thickness of 4 to 7 μm.

TABLE 1

| | Stretch ratio (times) | | Young's modulus (kg/mm$^2$) | | | Tensile strength | Tensile elongation | Plane orientation | Longitudinal orientation | Heat shrinkage (length) (%) | Ra (nm) | Magnetic tape characteristics | | Electromagnetic characteristics |
| --- | --- | --- | --- | --- | --- | --- | --- | --- | --- | --- | --- | --- | --- | --- |
| | Machine direction | Transverse direction | Em | Et | Et/Em | | | | | | | Running properties | Output | |
| CEx.1 | 3.8 | 4.5 | 550 | 1,100 | 2.0 | 40.0/30.8 | 89/45 | 0.263 | 1.035 | 2.5 | 8 | X | Δ | 0 |
| Ex.1 | 2.6 | 6.2 | 520 | 1,590 | 3.1 | 21.4/57.3 | 145/16 | 0.247 | 1.024 | 1.0 | 7 | A** | ○ | +1.8 |
| Ex.2 | 2.4 | 6.2 | 510 | 1,740 | 3.4 | 20.2/61.4 | 164/17 | 0.244 | 1.021 | 0.9 | 7 | A** | ○ | +2.2 |
| Ex.3 | 2.0 | 6.3 | 490 | 2,200 | 4.0 | 18.7/67.3 | 210/15 | 0.243 | 1.019 | 0.9 | 6 | A** | ○ | +2.2 |
| Ex.4 | 3.7 | 7.0 | 540 | 1,450 | 2.7 | 30.5/65.8 | 128/28 | 0.248 | 1.022 | 1.0 | 8 | A** | ○ | +1.9 |

CEx. = Comparative Example, Ex. = Example
A** = Excellent

What is claimed is:

1. A unidirectionally long, biaxially oriented film of polyethylene-2,6-naphthalenedicarboxylate:

10. A magnetic tape formed of the unidirectionally long, biaxially oriented film of claim 1 and a magnetic layer.

* * * * *